United States Patent [19]
Kuchibhotla

[11] Patent Number: 5,724,100
[45] Date of Patent: Mar. 3, 1998

[54] METHOD AND APPARATUS FOR DETECTING SCENE-CUTS IN A BLOCK-BASED VIDEO CODING SYSTEM

[75] Inventor: Prashanth Kuchibhotla, Yardley, Pa.

[73] Assignee: David Sarnoff Research Center, Inc., Princeton, N.J.

[21] Appl. No.: 606,613

[22] Filed: Feb. 26, 1996

[51] Int. Cl.[6] .................................................. H04N 7/34
[52] U.S. Cl. .................................... 348/420; 348/700
[58] Field of Search ...................................... 348/700, 409, 348/411, 412, 413, 415, 416, 420, 390, 384; 382/232, 236, 238; 386/81, 124

[56] References Cited

U.S. PATENT DOCUMENTS

| | | | |
|---|---|---|---|
| 5,377,051 | 12/1994 | Lane et al. | 386/124 |
| 5,404,174 | 4/1995 | Sugahara | 348/700 |
| 5,459,517 | 10/1995 | Kunitake et al. | 348/416 |
| 5,493,345 | 2/1996 | Ishikawa et al. | 348/700 |
| 5,532,746 | 7/1996 | Chang | 348/415 |

*Primary Examiner*—Amelia Au
*Attorney, Agent, or Firm*—William J. Burke

[57] ABSTRACT

The scene cut detector compares predicted macroblocks from an anchor image to input macroblocks from an input image on a macroblock-by-macroblock basis to generate a residual macroblock representing the difference between each predicted macroblock and each input macroblock. A variance for each residual macroblock and a variance for each input macroblock is computed after each comparison. The residual variance is compared to the input macroblock variance. Whenever the variance of the residuals macroblock exceeds the variance of the input macroblock, a counter is incremented. The scene cut detector repeats this process until each macroblock in the predicted image is compared to each input macroblock. If the count value ever exceeds a threshold level while a input image is being processed, the scene cut detector sets a scene cut indicator flag.

14 Claims, 2 Drawing Sheets

METHOD AND APPARATUS FOR DETECTING SCENE-CUTS IN A BLOCK-BASED VIDEO CODING SYSTEM

The invention relates to a block-based video coding technique and, more particularly, the invention relates to a method and apparatus for detecting scene cuts in a video sequence within a block-based video coding system.

BACKGROUND OF THE DISCLOSURE

Block-based video coding systems typically use a coding technique that takes advantage of both spatial and temporal redundancy within an image (intra-picture) and between images (inter-picture) within a sequence of images. Such block-based image coding systems including those that utilize the well-known Moving Picture Experts Group (MPEG) standard of video coding); namely, ISO/IEC international standards 11172-2 (1994) (generally referred to as MPEG-1) and 13818-2 (Jan. 20, 1995 draft) (generally referred to as MPEG-2). To take advantage of the redundancies in an input video sequence and efficiently code a video sequence into a transmittable bitstream, block-based coding techniques assume that the sequential pictures within an input video sequence contain substantially similar information, i.e., the imaged scene changes very little from picture to picture. A scene cut occurring in the picture sequence violates the underlying assumption for efficient coding. Consequently, after a scene change (scene cut), a block-based coding technique must use a substantial number of bits to code the first picture following the scene change. Because the number of bits available to code any one image is typically limited, a scene cut can cause substantial errors in the coding and lead to substantial distortion of the decoded picture.

Therefore, a need exists in the art for a method and apparatus that detects the occurrence of a scene cut prior to coding the pictures such that the coding system can take certain actions to avoid substantial coding errors.

SUMMARY OF THE INVENTION

The disadvantages heretofore associated with the prior art are overcome by the present invention of a scene cut detector for incorporation into a conventional block-based video coding system. The scene cut detector compares predicted macroblocks from a predicted image to input macroblocks from an input image on a macroblock-by-macroblock basis to generate a residual macroblock representing the difference between each predicted macroblock and each input macroblock. A variance for each residual macroblock and a variance for each input macroblock is computed after each comparison. The variances of the residual macroblock and the input macroblock are compared to a decision function. Depending upon the outcome of the decision function comparison, a counter is incremented. The scene cut detector repeats this process until each macroblock in the predicted image is compared to each input macroblock. If the count value ever exceeds a threshold level while a input image is being processed, the scene cut detector identifies the input image as being within a new scene and, in response, sets a scene cut indicator flag.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
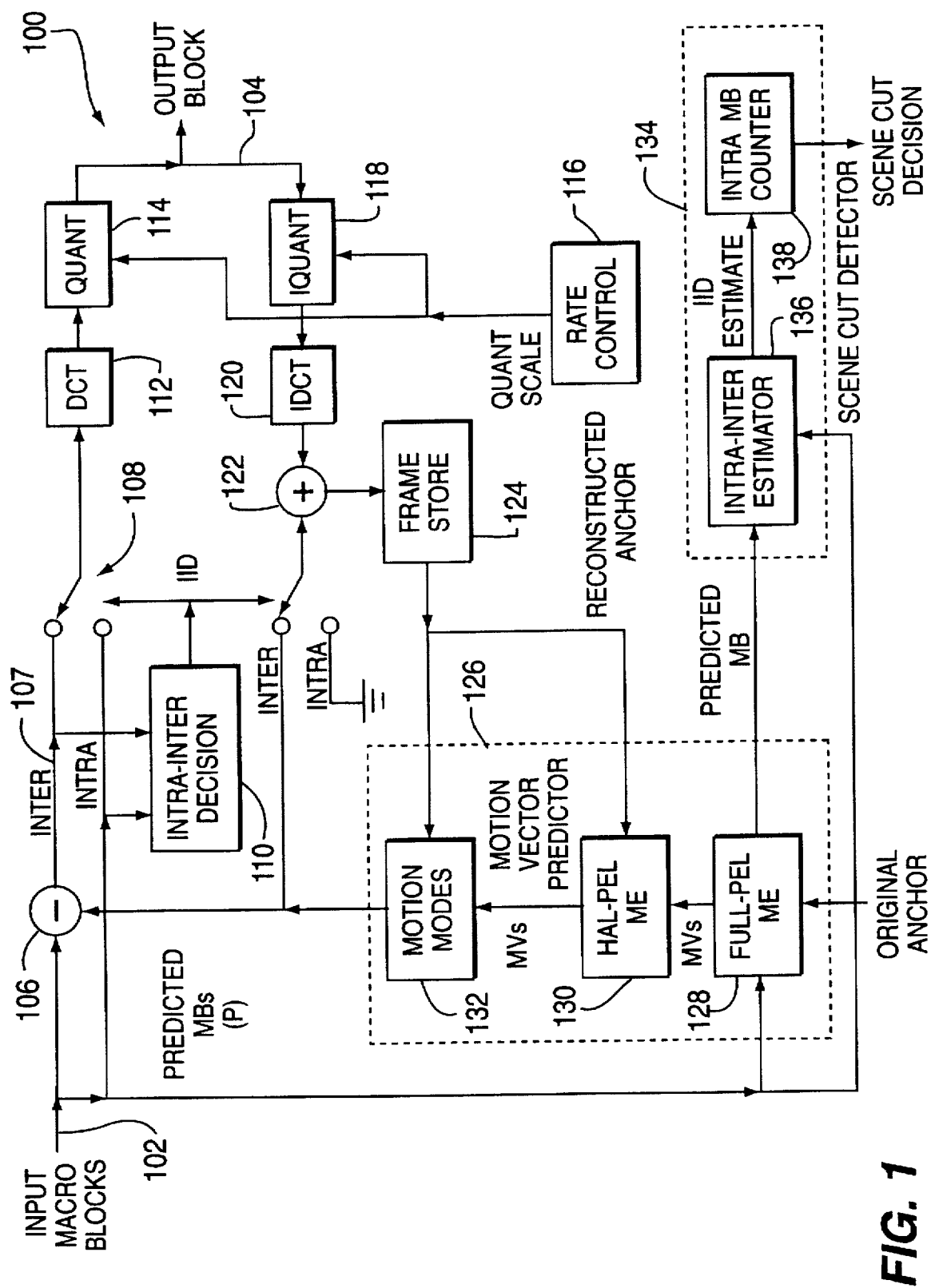
FIG. 1 depicts a block diagram of a block-based coding system incorporating a scene cut detector of the present invention.

FIG. 1 depicts a block diagram of a block-based coding system 100 (specifically, an MPEG encoder) incorporating the present invention. The input signal, at port 102, to the system is a preprocessed image that has been partitioned into a plurality of blocks, where the blocks are sequentially provided as an input to the system. Under the MPEG standard, these blocks of pixels are commonly known as macroblocks, e.g., a 16×16 pixel block. The following disclosure uses the MPEG standard terminology; however, it should be understood that the term macroblock is intended to describe a block of pixels of any size that is used for the basis of motion compensation.

The system computes, from the system output signal, a series of predicted macroblocks (P). Each predicted macroblock is illustratively produced by decoding the output signal, at port 104, just as the receiver of the transmitted output signal would decode the received signal. Subtractor 106 generates, on path 107, a residual signal (also referred to in the art as simply the residual or the residual macroblock) by subtracting the predicted macroblock from the input macroblock.

If the predicted macroblock is substantially similar to the input macroblock, the residuals are relatively small and are easily coded using very few bits. In such a scenario, the input macroblock is said to be motion compensated. However, if the difference between the predicted macroblock and the input macroblock is substantial, the residuals are difficult to code. Consequently, the system is better off directly coding the input macroblock in lieu of coding the motion compensated residual macroblock. This selection is known as a selection of the cooling mode. Coding the input macroblock I is referred to as intra-coding, while coding the residuals is referred to as inter-coding. The selection between these two modes is known as the Intra-Inter-Decision (IID).

The IID is made by the IID circuit 110, which sets the coding mode switch 108. The IID is computed by first computing the variance of the residual macroblock (Var R) and the variance of the input macroblock (Var I). The coding decision is based on these values. There are several functions that can be used to make this decision. For example, if Var R is less than Var I, the IID selects the Inter-mode. Conversely, if Var I is less than Var R, the IID selects the Intra-mode.

The selected block is processed in a discrete cosine transform (DCT) block 112. The DCT produces coefficients representing the input signal to the DCT. The quantizer 114 quantizes the coefficients to produce the output block at port 104. The rate control block 116 controls the quantization scale (step size) used to quantize the coefficients.

To produce correct predicted blocks and to accomplish efficient half-pel motion vector generation, the encoder needs access to the decoded images. In order to accomplish such access, the quantizer 114 output is passed through both the inverse quantizer 118 and inverse DCT 120. The output of the inverse DCT is ideally identical to the input to the DCT 112. In the inter-mode, the decoded macroblock is produced by summing the output of the inverse DCT and the predicted macroblock. During the intra-mode, the decoded macroblock is simply the output of the inverse DCT. The decoded macroblocks are then stored in the frame store 124. The frame store accumulates a plurality of these "reconstructed" macroblocks that constitute an entire reconstructed frame of image information. The reconstructed frame is used by the motion vector predictor 126 to produce motion vectors that are used in generating predicted macroblocks for forthcoming input images.

To generate motion vectors, the motion vector predictor 126 comprises three components: a full-pel motion estimator 128, a half-pel motion estimator 130, and a motion mode block 132. The full-pel motion estimator 128 is a "coarse" motion vector generator that searches for a coarse match between a macroblock in a previous image and the present input macroblock. The previous image is referred to as an anchor image. Under the MPEG standards, the anchor image is what is known as an I or P frame within an image sequence known as a Group Of Pictures (GOP). The motion vector is a vector representing the relative position where a coarse match was found between the two macroblocks. The coarse motion vector generator produces a motion vector that is accurate to one picture element (pel).

The accuracy of the full-pel motion estimator is improved in the half-pel motion estimator. The half-pel estimator uses the full-pel motion vectors and the reconstructed macroblocks from the frame store 124 to compute motion vectors to half-pel accuracy. The half-pel motion vectors are then sent to the motion modes block 132. Typically, there are multiple motion vectors related to each macroblock. The modes block 132 selects the best motion vector for representing motion for each input macroblock.

The full-pel estimator is a computationally intensive task compared to the half-pel estimator. For this reason, in several implementations, it is computed separately on dedicated hardware. Often, all the full-pel motion vectors are computed before half-pel processing begins.

The MPEG encoder system discussed above is a conventional system that is available as a set of integrated circuits as model L64120 from LSI Logic, Inc. of Milpitas, Calif. Importantly, this MPEG encoder stores an entire frame of full-pel motion vectors before the half-pel estimator begins operation.

The concepts of Motion Estimation and Motion Compensation are based on an underlying assumption that the current picture is not very different from a previously occurring picture (the anchor image). However, when a scene change (also called a scene cut) occurs, the anchor pictures are substantially different from the current picture. Hence, the predicted macroblocks are very inaccurate and the residuals are large. As such, for most input macroblocks of a picture, the IID selects the input macroblock (intra-mode) for coding in lieu of coding the residuals (inter-mode). It should be noted that this coding decision occurs even in the case where there is no scene change, and that a normally coded picture may contain a mixture of intra- and inter-coded macroblocks. However, the percentage of intra-coded macroblocks significantly increases when a scene cut occurs. The scene cut detector of the present invention analyzes all the macroblocks in a picture and then determines whether a scene cut has occurred. This is accomplished by counting the number of intra-coded macroblocks and comparing the count to a threshold level. Specifically, if the percentage of I coded macroblocks in any given frame exceeds the threshold level, that frame is deemed to follow a scene cut.

In a typical MPEG encoder, the actual IID decision is made after the half-pel motion vectors are generated and best motion vector is chosen. Since the full-pel estimator 128 generates motion vectors for the entire frame before the first macroblock is coded by the encoder, the inventive scene cut detector apparatus 134 monitoring these full-pel results is able to produce an IID estimate for all macroblocks, i.e., an estimate that the IID would make when it does analyze the residuals. The scene cut detector comprises an IID estimator 136 connected in series to an intra-code macroblock counter 138. The counter 138 generates a scene cut decision (a flag) indicating that the scene cut detector has determined that a scene cut has occurred.

Figure 2:
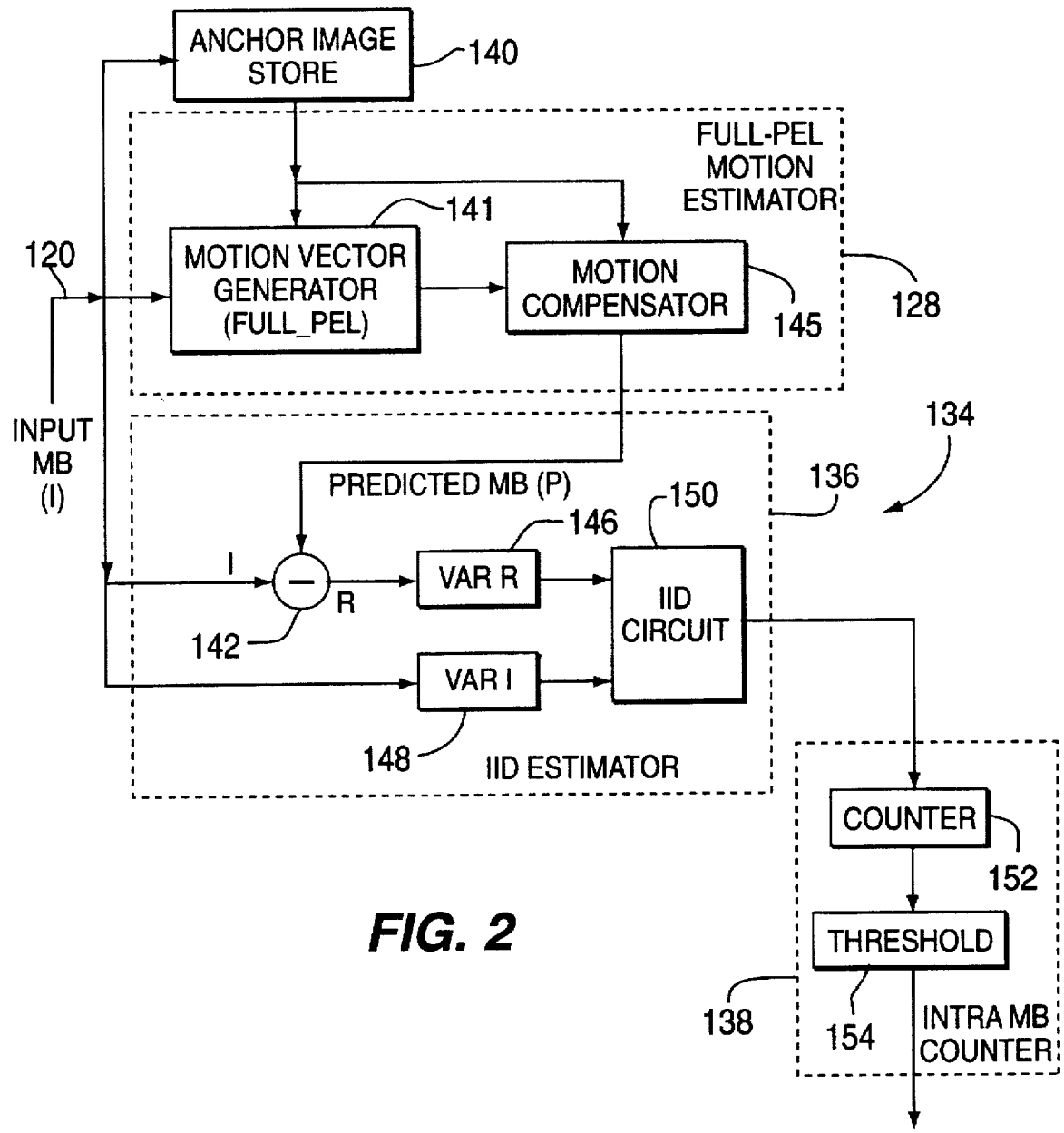
FIG. 2 depicts a detailed block diagram of a scene cut detector of the present invention.

FIG. 2 depicts a detailed block diagram of the inventive scene cut detector 134 of the MPEG encoder 100. The full-pel motion estimator 128 is provided the I macroblocks as well as the appropriate I or P anchor image in which the predicted macroblocks are found. The anchor images are stored in the frame memory 140. The full-pel motion vector generator 141 generates the motion vectors for each input macroblock using one of many well-known methods including those disclosed in U.S. Pat. No. 5,351,095, issued Sep. 27, 1994, incorporated herein by reference, and U.S. patent application Ser. No. 08/300,023, filed Sep. 2, 1994, incorporated herein by reference. Using the full-pel motion vectors and the anchor images from the anchor image store 140, the motion compensator 145 generates the predicted macroblock (P) for each input macroblock (I).

The input macroblocks (path 120) and the predicted image macroblocks (P) form inputs to the scene cut detector 134. The IID estimator 136 computes full-pel residual by subtracting (subtractor 142) the predicted macroblock from the input macroblock. The IID estimator then computes, using the variance blocks 146 and 148, the variance of the input macroblocks (Var I) and the variance of the full-pel residuals (Var R). The IID circuit 150 then makes its IID estimate based on these variances. The counter 152 counts the number of intra-mode decisions and compares, in block 154, the count number to a threshold count value. If, while processing a given picture, the count number ever exceeds the threshold, the intra MB counter generates a scene cut decision flag.

Figure 3:
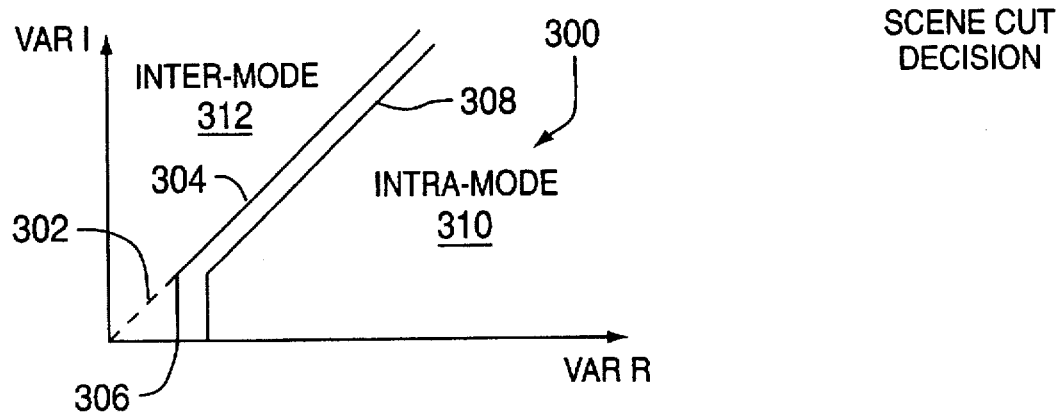
FIG. 3 depicts a graph of a decision function used by the IID estimator of the present invention.

FIG. 3 depicts a graph 300 of a typical decision function used by the IID estimator in comparing Var R and Var I. The simplest decision function is linear function 302. This function is implemented using a comparator such that when Var I is less than Var R, the IID estimates is in intra-mode (region 310). Conversely, when Var R is less than Vat I, the IID estimate is inter-mode (region 312).

However, though simple, a linear function does not tend to provide the best results. Thus, non-linear function 304 represents a more typical function. This function is vertical at a particular value 306 of Var R and then is linear. In operation, macroblocks with relatively small values of Var R are coded using the inter-mode. Any value of Var R greater than value 306 is compared using the direct comparison of function 302.

Since the half-pel motion estimator more accurately defines the motion vectors, a macroblock having Var R value that is only slightly greater than the Var I value, e.g., a point lying near, but just beneath the curve 302, can be shifted above the curve when more accurate estimation is accomplished using the half-pel estimator. As such, the IID of the MPEG encoder would use inter-mode coding, yet the IID estimation in the scene cut detector would estimate that intra-mode coding would be used. To compensate for this anomaly, function 308 is generally used. Function 308 is similar in form to function 304; however, the function 308 is shifted slightly below function 304. Thus, incorrect IID estimations are avoided, i.e., those valves that would lie near the curve, now lie in the inter-mode region.

Of course, the functions depicted in FIG. 3 are merely illustrative. Other linear and non-linear functions are used to achieve particular results. The invention is intended to include any function within the IID estimator.

During a typical sequence of macroblocks (no scene cut), the predicted macroblocks, even at full-pel accuracy, will yield mostly inter-mode decisions. Thus, the scene cut flag will not be set. Note that t percentage of intra-mode decisions made after half-pel refinement will be lower because of the additional accuracy in the motion vectors.

When a scene cut occurs, it does not matter whether the system generates motion vectors to half-pel or full-pel accuracy. The motion estimation will be inaccurate in either case. A substantial number of intra-mode macroblocks are selected at both the full-pel and the half-pel stages. Therefore, the rough count of intra-mode decisions using the IID estimator at full-pel accuracy is sufficient for scene cut detection.

The threshold is generally set to be exceeded when 33% (one-third) of the estimated decisions are intra-mode decisions. Of course, the threshold can be set at any percentage that is required by the expected image sequence content.

In addition to detecting scene cuts, the invention is also useful in detecting pictures that are not going to code very well. For example, if an imaged scene is changing unpredictably, as occurs when an object moves in and out from behind another object within the scene, two consecutive pictures in a sequence representing the scene will be substantially different. For such images, the encoder could exceed a coding bit budget for the picture sequence, i.e., utilize more bits to code the images than can be transmitted through the communications channel. The inventive detector is used to detect, before coding begins, the picture that will be difficult to predict and code. Consequently, the encoder can alter the coding strategy to avoid exceeding the bit budget.

One particular apparatus that uses the scene cut detector flag is described in U.S. patent application Ser. No. 08/606, 622 filed simultaneously herewith (Attorney Docket 11817) and incorporated herein by reference. In response to the flag, this apparatus alters the quantization scale such that the encoder coarsely codes the picture and the bit budget is preserved.

Although a single embodiment which incorporates the teachings of the present invention has been shown and described in detail herein, those skilled in the art can readily devise many other varied embodiments that still incorporate these teachings.

What is claimed is:

1. In a block-based video encoder that partitions each input image of a sequence of input images into a plurality of macroblocks, computes at least one motion vector for each of said macroblocks, and generates a sequence of predicted images, where each predicted image in said sequence comprises a plurality of predicted macroblocks derived from said input images and said motion vectors, a method of detecting that a first image is substantially different from a second image within said sequence of input images comprising the steps of:
   (a) estimating a coding mode that is to be used by the block-based video encoder to code a macroblock within said second image;
   (b) incrementing a count value whenever the coding mode is estimated to be a particular type of coding mode;
   (c) repeating steps a and b until the coding mode is estimated for each macroblock in the second image; and
   (d) when the count value exceeds a threshold level, setting an indicator flag.

2. The method of claim 1 wherein said estimating step further comprises the steps of:
   comparing a predicted macroblock to an input macroblock from said first image to generate a residuals macroblock;
   computing a variance of the input macroblock and the residuals macroblock;
   comparing the variance of the input macroblock and the variance of the residuals macroblock to a decision function; and
   in response to a particular outcome of said comparing step, incrementing said count value.

3. The method of claim 1 wherein said particular type of coding mode is an intra-block coding mode.

4. The method of claim 1 wherein the count value exceeds the threshold level whenever a scene cut has occurred in said sequence of images.

5. The method of claim 1 wherein said threshold level is set to thirty percent of the total number of macroblocks in the input image.

6. In a block-based video encoder that partitions each input image of a sequence of input images into a plurality of macroblocks, computes at least one motion vector for each of said macroblocks, and generates a sequence of predicted images, where each predicted image in said sequence comprises a plurality of predicted macroblocks derived from said input images and said motion vectors, a method of detecting that a first image is substantially different from a second image within said sequence of input images comprising the steps of:
   (a) comparing a predicted macroblock to an input macroblock from said first image to generate a residuals macroblock;
   (b) computing a variance of the input macroblock and the residuals macroblock;
   (c) comparing the variance of the input macroblock to the variance of the residuals macroblock;
   (d) if the variance of the residuals macroblock exceeds the variance of the input macroblock, incrementing a count value;
   (e) repeating steps a, b, c, d, and e, until each macroblock in the predicted image is compared to each input macroblock; and
   (f) when the count value exceeds a threshold level, setting an indicator flag.

7. The method of claim 6 wherein said variance of the residuals macroblock exceeds the variance of the input macroblock to produce a count value that exceeds the threshold level whenever a scene cut has occurred in said sequence of images.

8. The method of claim 6 wherein said threshold level is set to approximately thirty-three percent of the total number of macroblocks in the input image.

9. In a block-based video encoder that partitions each input image of a sequence of input images into a plurality of macroblocks, computes at least one motion vector for each of said macroblocks, and generates a sequence of predicted images, where each predicted image in said sequence comprises a plurality of predicted macroblocks derived from said input images and said motion vectors, apparatus of detecting that a first image is substantially different from a second image within said sequence of input images comprising:

a coding mode estimator, connected to a motion estimator within said block-based video encoder and a source of input images, for estimating the coding mode that is to be used by said block-based video encoder to code each macro-block of said second image;

a counter, connected to said coding mode estimator, for incrementing a count value whenever a number of macroblocks coded using a first coding mode and a number of macroblocks coded using a second coding mode compare favorably with a decision function; and thresholding means, connected to said counter, for setting an indicator flag when the count value exceeds a threshold level.

10. The apparatus of claim 9 wherein said coding mode estimator comprises:

subtractor, connected to said motion estimator and a source of said input image, for comparing each of the predicted macroblocks to an input macroblock to generate a residuals macroblock;

a residuals variance generator, connected to said subtractor, for computing a variance of the residuals macroblocks;

a input variance generator, connected to said source of the input image, for computing a variance of the input macroblocks;

a decision circuit, connected to the residuals variance generator and the input variance generator, for comparing the variance of the input macroblocks and the variance of the residuals macroblocks to a decision function, wherein when the variance of said residuals macroblock and the variance of the input macroblock compares with the decision function to produce a first output, the block-based video encoder is estimated to be using the second coding mode and when the variance of said residuals macroblock and the variance of the input macroblock compares with the decision function to produce a second output, the block-based video encoder is estimated to be using the first coding mode.

11. The apparatus of claim 10 wherein said first coding mode is an inter-block coding mode and the second coding mode is an intra-block coding mode.

12. The apparatus of claim 9 wherein the count value exceeds the threshold level whenever a scene cut has occurred in said sequence of images.

13. The apparatus of claim 9 wherein said threshold level is set to approximately thirty-three percent of the total number of macroblocks in the input image.

14. The apparatus of claim 10 wherein said decision circuit is a comparator, connected to the residuals variance generator and the input variance generator, for comparing the variance of the input macroblocks to the variance of the residuals macroblocks, wherein when the variance of said residuals macroblock exceeds the variance of the input macroblock, the block-based video encoder is estimated to be using the second coding mode and when the variance of said input macroblock exceeds the variance of the residuals macroblock, the block-based video encoder is estimated to be using the first coding mode.

* * * * *